US012608027B2

(12) United States Patent
Abuhadi et al.

(10) Patent No.: US 12,608,027 B2
(45) Date of Patent: Apr. 21, 2026

(54) USING TWO OR MORE PRESSURE REGULATORS IN SERIES AS A FLOW REGULATOR

(71) Applicant: SAUDI ARABIAN OIL COMPANY, Dhahran (SA)

(72) Inventors: Basil S. Abuhadi, Jeddah (SA); Mutlaq F. Azmi, As Saffaniyah (SA); Carlos Javier Parra, Katy, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 386 days.

(21) Appl. No.: 18/487,678

(22) Filed: Oct. 16, 2023

(65) Prior Publication Data

US 2025/0123639 A1      Apr. 17, 2025

(51) Int. Cl.
*G05D 7/06* (2006.01)
(52) U.S. Cl.
CPC .................................. *G05D 7/0664* (2013.01)
(58) Field of Classification Search
CPC ........................... G05D 7/0126; G05D 7/0664
See application file for complete search history.

(56) References Cited

U.S. PATENT DOCUMENTS

| | | |
|---|---|---|
| 5,983,926 A | 11/1999 | Mastuzawa |
| 2005/0039797 A1 | 2/2005 | Carlson |

| | | | | |
|---|---|---|---|---|
| 2007/0163657 A1* | 7/2007 | Yoshino | .................. | F16K 17/22 |
| | | | | 137/510 |
| 2013/0019956 A1* | 1/2013 | Hallman, Jr. | ........... | G05D 7/01 |
| | | | | 137/565.29 |
| 2014/0007953 A1* | 1/2014 | Kirchner | .............. | G05D 16/024 |
| | | | | 137/505.12 |

OTHER PUBLICATIONS

"Constant Flow Valves;" Accessed Oct. 2023; Retrieved from the Internet: URL: https://www.bertfelt.com/constant-flow-valves/ (4 pages).

* cited by examiner

*Primary Examiner* — Omer S Khan
(74) *Attorney, Agent, or Firm* — Osha Bergman Watanabe & Burton LLP

(57) ABSTRACT

A method to control a flow rate in a fluid flow network is disclosed. The method includes setting the outlet port of an upstream pressure regulator in a flow control device to have a first constant pressure that is below a minimum upstream pressure delivered from a upstream portion to the inlet port of the upstream pressure regulator, setting the outlet port of a downstream pressure regulator in the flow control device to have a second constant pressure to maintain a constant pressure differential across the downstream pressure regulator, and maintaining, based on the minimum upstream pressure to the flow control device exceeding the first constant pressure and further based on the constant pressure differential maintained across the downstream pressure regulator, the flow rate of the flow control device at a constant value.

17 Claims, 3 Drawing Sheets

Legend
1. Pressure Setting Screw
2. Spring
3. Actuator
4. Inlet Port (High Pressure)
5. Outlet Port (Low Pressure)
6. Valve Body
7. Valve Seat
8. Valve Plug
9. Upper Chamber Legend 1. Pressure Setting Screw
2. Spring
3. Actuator
4. Inlet Port (High Pressure)
5. Outlet Port (Low Pressure)
6. Valve Body
7. Valve Seat
8. Valve Plug
9. Upper Chamber

USING TWO OR MORE PRESSURE REGULATORS IN SERIES AS A FLOW REGULATOR

BACKGROUND

A pressure regulator is a valve that controls the pressure of a fluid to a desired value using negative feedback from the controlled pressure. A regulator can be an integral device with a pressure setting mechanism, a restrictor, and a sensor all integrated in one mechanical assembly, or consist of a separate pressure sensor, controller, and flow valve. A pressure reducing regulator is a control valve that reduces the input pressure of a fluid to a desired value at the output. It is a normally-open valve and is installed upstream of pressure sensitive equipment

SUMMARY

In general, in one aspect, the invention relates to a method to control a flow rate in a fluid flow network of a system. The method includes identifying a location in the fluid flow network to set the flow rate of a fluid at a constant level, connecting multiple pressure regulators to form a flow control device, connecting an inlet port of the flow control device to an upstream portion of the fluid flow network at the identified location, connecting an outlet port of the flow control device to a downstream portion of the fluid flow network at the identified location, setting an upstream pressure regulator in the flow control device to have a first constant pressure at the outlet port of the upstream pressure regulator, the first constant pressure being set to a value that is below a minimum upstream pressure delivered from the upstream portion to the inlet port of the upstream pressure regulator, setting a downstream pressure regulator in the flow control device to have a second constant pressure at the outlet port of the downstream pressure regulator, the second constant pressure being set to maintain a constant pressure differential across the downstream pressure regulator, and maintaining, based on the minimum upstream pressure to the flow control device exceeding the first constant pressure and further based on the constant pressure differential maintained across the downstream pressure regulator, the flow rate at the identified location at the constant value.

In general, in one aspect, the invention relates to a flow control device for a fluid flow network. The flow control device includes an upstream pressure regulator that is set to have a first constant pressure at an outlet port of the upstream pressure regulator, the first constant pressure being set to a value that is below a minimum upstream pressure delivered from an upstream portion of the fluid flow network to an inlet port of the upstream pressure regulator, and a downstream pressure regulator that is set to have a second constant pressure at the outlet port of the downstream pressure regulator, the second constant pressure being set to maintain a constant pressure differential across the downstream pressure regulator, wherein the upstream pressure regulator is coupled to the downstream pressure regulator at an identified location in the fluid flow network to set a flow rate of a fluid to be a constant level, wherein the inlet port of the flow control device is connected to an upstream portion of the fluid flow network at the identified location, wherein the outlet port of the flow control device is connected to a downstream portion of the fluid flow network at the identified location, and wherein the flow rate at the identified location is maintained at the constant value based on the minimum upstream pressure to the flow control device exceeding the first constant pressure and further based on the constant pressure differential maintained across the downstream pressure regulator.

In general, in one aspect, the invention relates to a fluid flow system that includes an upstream portion of a fluid flow network, a downstream portion of the fluid flow network, and a flow control device disposed at an identified location of the fluid flow network, comprising an upstream pressure regulator that is set to have a first constant pressure at an outlet port of the upstream pressure regulator, the first constant pressure being set to a value that is below a minimum upstream pressure delivered from the upstream portion of the fluid flow network to an inlet port of the upstream pressure regulator, and a downstream pressure regulator that is set to have a second constant pressure at the outlet port of the downstream pressure regulator, the second constant pressure being set to maintain a constant pressure differential across the downstream pressure regulator, wherein the upstream pressure regulator is coupled to the downstream pressure regulator at the identified location in the fluid flow network to set a flow rate of a fluid to be a constant level, wherein the inlet port of the flow control device is connected to the upstream portion of the fluid flow network at the identified location, wherein the outlet port of the flow control device is connected to the downstream portion of the fluid flow network at the identified location, and wherein the flow rate at the identified location is maintained at the constant value based on the minimum upstream pressure to the flow control device exceeding the first constant pressure and further based on the constant pressure differential maintained across the downstream pressure regulator.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (for example, first, second, third) may be used as an adjective for an element (that is, any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include a device and method of controlling a predetermined constant fluid flow in a system. Specifically, a location is identified in the fluid flow network of the system to set the flow rate of a fluid at a constant level. In some embodiments of the invention, multiple pressure regulators are connected to form a flow control device where the inlet port and outlet port of the flow control device are connected to an upstream portion and a downstream portion of the fluid flow network at the identified location. An upstream pressure regulator in the flow control device is set to have a first constant pressure at the outlet port of the upstream pressure regulator, the first constant pressure being set to a value that is below a minimum upstream pressure delivered from the upstream portion to the inlet port of the upstream pressure regulator. A downstream pressure regulator in the flow control device is set to have a second constant pressure at the outlet port of the downstream pressure regulator, the second constant pressure being set to maintain a constant pressure differential across the downstream pressure regulator. Accordingly, based on the minimum upstream pressure to the flow control device exceeding the first constant pressure and further based on the constant pressure differential maintained across the downstream pressure regulator, the flow rate at the identified location is maintained at the constant value.

Figure 1:
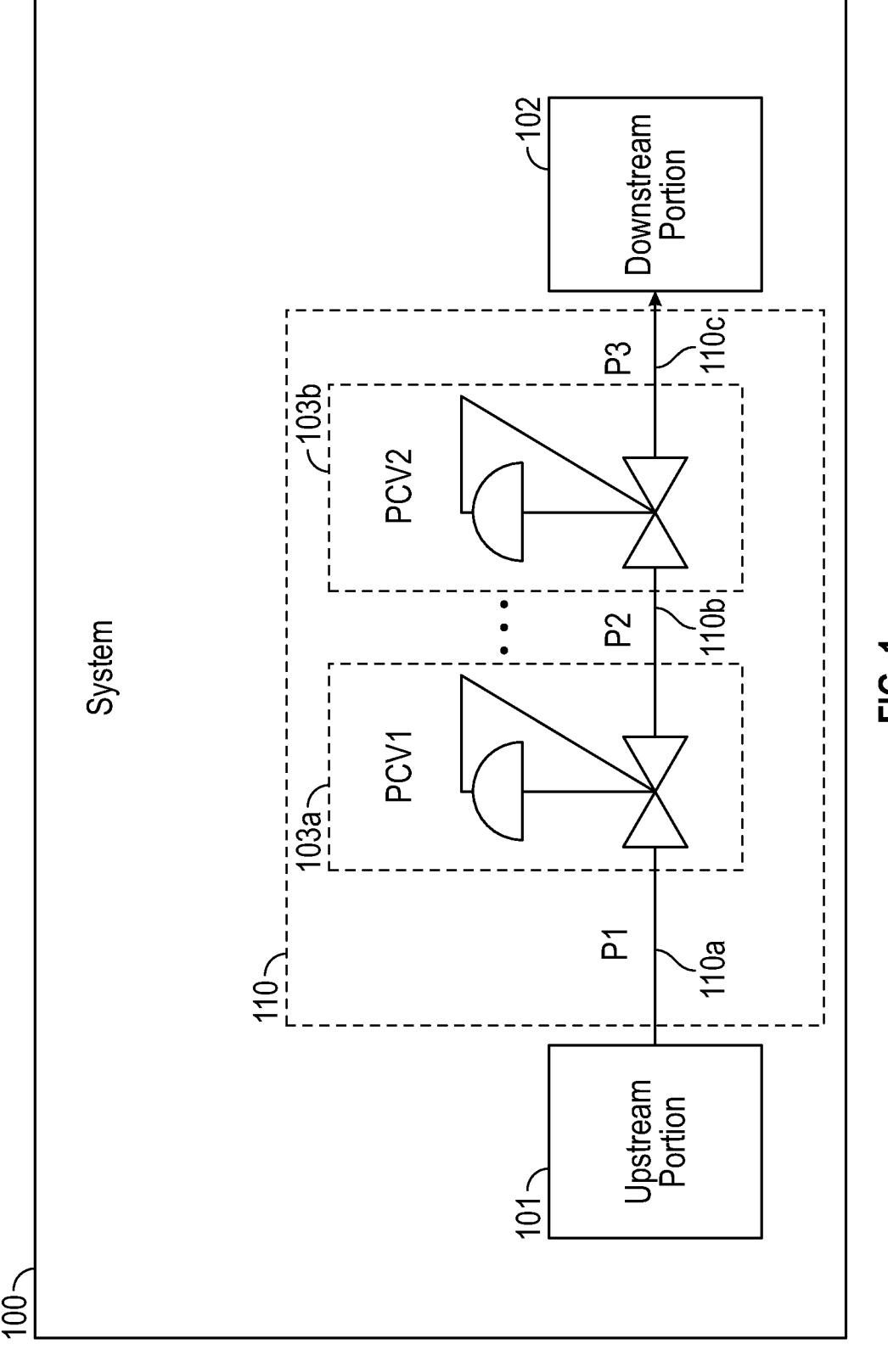
FIG. 1 shows a system in accordance with one or more embodiments.

FIG. 1 shows a schematic diagram of a system in accordance with one or more embodiments. As shown in FIG. 1, FIG. 1 illustrates a system (100) that performs its desired functions based on fluid flows through various portions (e.g., upstream portion (101), downstream portion (102)) of the system where a predetermined constant flow rate is maintained for a location (110) identified in a fluid flow network. For example, the system (100) may include a cooling system to have constant or known rate of heat exchange between two fluid processes where the identified location (110) is upstream to a heat exchanger in the downstream portion (102). In another example, the system (100) may include a system having a mechanical seal for rotating components to have constant cooling flow for a pump gasket where the identified location (110) is upstream to the mechanical seal in the downstream portion (102). In yet another example, the system (100) may include a system that limits maximum flow of liquid to prevent damaging filters and/or causing erosions wherein the identified location (110) is upstream to the filter in the downstream portion (102). In still another example, the system (100) may include a fluid mixing system to have a controlled mix of two liquids physically or for inducing a desired chemical reaction. In still another example, the system (100) may include a system that protects against cavitation effects resulted from high fluid flow rate. In still another example, the system (100) may include an emergency shower system that prevents operators from mistakes in adjusting flow, etc.

As shown in FIG. 1, the system (100) includes the upstream portion (101) and downstream portion (102) connected by two or more pressure regulators (103a, 103b) via fluid flow connections (110a, 110b, 110c) at the identified location (110). The pressure regulators (103a, 103b) are connected in series with each other. The series combination (e.g., 2 or more regulators in series) will help step down the pressure & therefore keep constant flow of the fluid. For example, each fluid flow connection may be a pipe or other conduit to guide the fluid flow. In one or more embodiments, the two or more pressure regulators (103a, 103b) are configured to act as a flow control device. Specifically, a self-controlled predetermined constant flow rate is achieved at the input to the downstream portion (102) by maintaining a constant differential pressure between the input and output of the pressure regulator (103b). In the example where two pressure regulators (103a, 103b), denoted as PCV1 and PCV2 are connected directly to each other without other intervening pressure regulators, P1 denotes a variable pressure from the upstream portion (101), which may be a process system. PCV1 is set to produce a constant pressure, denoted as P2 at its output that is lower than P1. PCV2 is set to produce a constant pressure, denoted as P3 that is lower than P2. Throughout a normal operating range where the PCV1 output pressure (P2) is set to be a constant value lower than the lowest possible upstream pressure (P1) from the upstream portion (101), the following equations hold true because the constant pressure differential across the input and output of PCV2 produces a constant flow rate through PCV2.

$$P1 > P2 > P3 \qquad \text{Eq. 1}$$

$$\Delta P = P2 - P3 = \left(\frac{Q}{K}\right)^2 \times S \qquad \text{Eq. 2}$$

$$P3 = P2 - \left(\frac{Q}{K}\right)^2 \times S \qquad \text{Eq. 3}$$

In Eq. 1 through Eq. 3, Q denotes the predetermined constant flow rate, K denotes a constant "Flow factor," and S denotes a constant "Specific gravity." In some embodiments, the value of P2 is selected based on the lowest possible upstream pressure (P1) from the upstream portion (101) and the value of P3 is selected based on the desired predetermined constant flow rate Q according to Eq. 3.

Although the example illustrated above relates to a two-regulator configuration, more than two pressure regulators may be connected in series and/or in parallel to achieve better control to the predetermined constant flow rate. The series combination (i.e., more than two regulators in series) improves stepping down the pressure to achieve a lower flow rate. The parallel combination (i.e., more than one regulator in parallel) improves handling of excessive flow rate at the beginning of initiating fluid flow though the system (100), more specifically through the upstream portion (101) during transient states and increases flow capacity of the system during steady state conditions. Based on the forgoing, pressure regulators PCV1, PCV2, etc. in either the series configuration or the parallel configuration are collectively referred to as being disposed at the identified location (110) in the fluid flow network where the flow rate needs to be constant to ensure proper operation of the fluid flow system (100). In this context, the flow control device formed by the series configuration or the parallel configuration is said to connect to the upstream portion (101) and the downstream portion (102) at the identified location (110).

Figure 2:
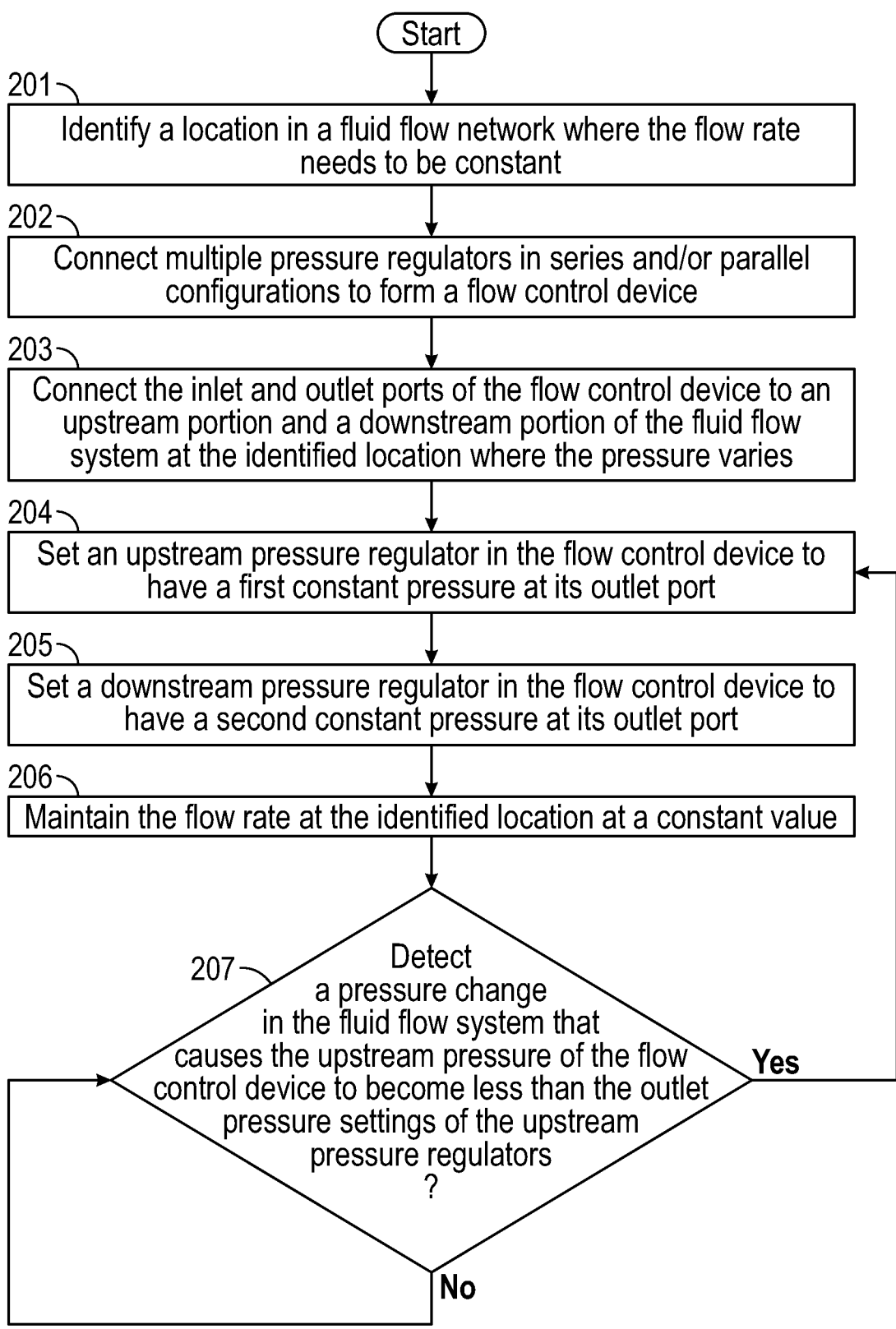
FIG. 2 shows a method flowchart in accordance with one or more embodiments.

FIG. 2 shows a flowchart in accordance with one or more embodiments disclosed herein. One or more of the steps in FIG. 2 may be performed by the component discussed above in reference to FIG. 1. In one or more embodiments, one or more of the steps shown in FIG. 2 may be omitted, repeated, and/or performed in a different order than the order shown in FIG. 2. Accordingly, the scope of the disclosure should not be considered limited to the specific arrangement of steps shown in FIG. 2.

Initially in Step 201, a location is identified in a fluid flow network of a system where the flow rate needs to be constant to ensure proper operation of the system. For example, a heat exchanger in a cooling system needs to have constant or known flow rate for two fluid processes, a cooling fluid for a mechanical seal of rotating components in a pump needs to have constant cooling flow for a pump gasket, a filter in a system that limits maximum flow of liquid to prevent damaging filters and/or causing erosions, etc.

In Step 202, multiple pressure regulators are connected in series and/or parallel configurations for form a flow control device. Throughout this disclosure, the term "connect" refers to establishing a fluid flow path using a pipe or other conduits that guide the fluid flow.

In Step 203, the inlet port of the flow control device is connected to an upstream portion of the fluid flow system at the identified location where the pressure varies. In addition, the outlet port of the flow control device is connected to the downstream portion of the fluid flow system at the identified location where flow rate needs to be controlled, e.g., maintained a constant flow rate.

In Step 204, an upstream pressure regulator in the flow control device is set to have a first constant pressure at its outlet port. The first constant pressure is set to a value that is below the lowest possible pressure delivered from the upstream portion to the inlet port of the upstream pressure regulator. For the flow control device having more than two pressure regulators, this step is repeated for all pressure regulators having variable inlet port pressure. These pressure regulators are collectively adjusted to produce consistent outlet port pressures at a common location where their outlet ports are connected together.

In Step 205, a downstream pressure regulator in the flow control device is set to have a second constant pressure at its outlet port. The second constant pressure is set to maintain a constant pressure differential across the downstream pressure regulator. The constant pressure differential corresponds to a pressure drop from the inlet port to the outlet port of the downstream pressure regulator. The constant pressure differential results in a constant flow rate at the outlet port of the downstream pressure regulator. For the flow control device having more than two pressure regulators, this step is repeated for all pressure regulators having constant inlet port pressure. These pressure regulators, when connected in series, are collectively adjusted to produce consistent flow rate throughout the series connections.

In Step 206, the flow rate at the identified location is maintained at a constant value as long as the minimum upstream pressure of the flow control device is greater that the outlet pressure settings of the upstream pressure regulators.

In Step 207, a pressure change in the fluid flow system is detected that causes the upstream pressure of the flow control device to become less than the outlet pressure settings of the upstream pressure regulators. In response to the detected pressure change, the method returns to Step 204 to adjust the pressure settings of the pressure regulators in the flow control device.

Figure 3:
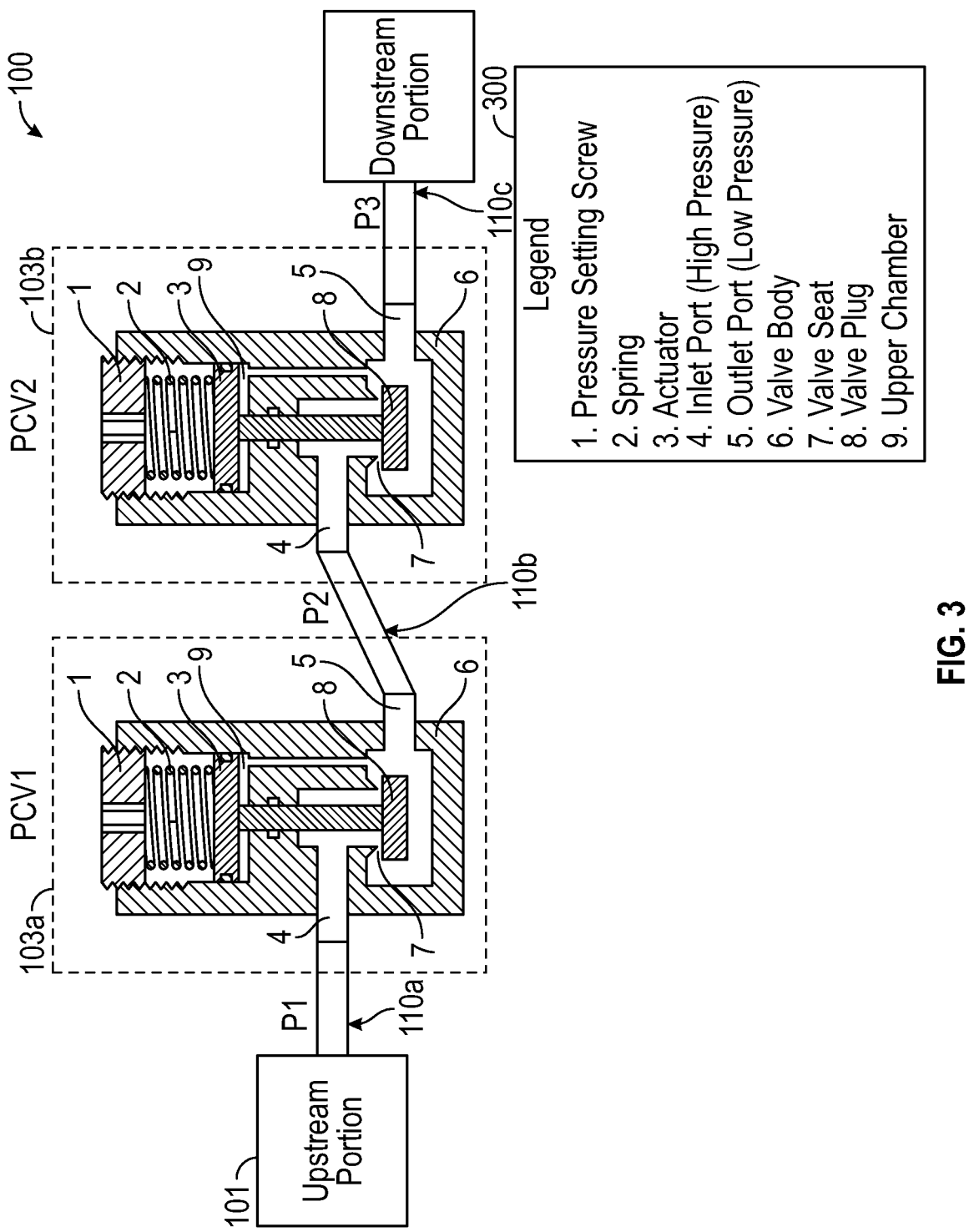
FIG. 3 shows an example in accordance with one or more embodiments.

FIG. 3 shows an implementation example in accordance with one or more embodiments. Specifically, FIG. 3 shows an example of system (100) depicted in FIG. 1 above using a two-regulator configuration where each regulator is illustrated in a cross-sectional view according to the legend (300). In particular, each of the pressure regulators (103*a*, 103*b*) includes a restricting element, a loading element, and a measuring element.

The restricting element is a valve that can provide a variable restriction to the flow, such as a globe valve, butterfly valve, poppet valve, etc. In the example shown in FIG. 3, the restricting element is a poppet valve restricting the fluid flow through a space in the valve body (6) between the valve seat (7) and valve plug (8).

The loading element is a part that can apply the needed force to the restricting element. This loading element may be a weight, a spring, a piston actuator, or any combination. In the example shown in FIG. 3, loading element is the diaphragm actuator (3) in combination with a spring (2).

The measuring element functions to determine when the fluid flow between the inlet port (4) and the outlet port (5) is equal to a desired pressure setting to maintain a desired flow. In the example shown in FIG. 3, the diaphragm actuator (3) itself is used as the measuring element as a combined element.

In each of the pressure regulators (103*a*, 103*b*), a force balance is used on the diaphragm actuator (3) to control the poppet valve in order to regulate pressure. With no pressure at the inlet port (4), the spring (2) pushes the diaphragm actuator (3) down on the valve plug (8), holding the poppet valve open. Once pressure is introduced to the inlet port (4), the open poppet valve allows fluid flow to the diaphragm actuator (3) and pressure in the upper chamber (9) and the output port (5) increases, until the diaphragm actuator (3) is pushed upward against the spring (2), reducing the space between the valve seat (7) and valve plug (8) to reduce fluid flow, finally stopping further increase of pressure at the upper chamber (9) and the output port (5). By adjusting the pressure setting screw (1), the downward pressure on the diaphragm actuator (3) can be increased, requiring more pressure in the upper chamber (9) to maintain equilibrium. In this way, the outlet port pressure of the regulator is controlled. In other words, the output pressure of each of the pressure regulators (103*a*, 103*b*) is set to a desired constant pressure level using the respective pressure setting screw (1).

Additional pressure regulator(s) can be added to combine with the two-regulator configuration described above. In the series combination, e.g., connecting one or more regulator as additional PCV2 between the pressure regulator (103*b*) and the downstream portion (102), the pressure and the fluid flow provided to the downstream portion (102) can be further reduced. For example, the pressure difference between the output of PCV1 and the downstream portion (102) may be divided among multiple PCV2's to reduce the input/output pressure differential of each individual PCV2, thus reducing the flow rate through the PCV2's accordingly to the reduced pressure differential. In the parallel combination, e.g., connecting one or more additional pair of PCV1 and PCV2 between the upstream portion (101) and the downstream portion (102), excessive flow from the upstream portion (101) occurring at the beginning of production process of the system (100) can be moderated during transient states, flow capacity of the system can be increased during steady state conditions. In some embodiment, instead of controlling pressure setting screws of the pressure regulators individually, the pressure setting screws of multiple or all pressure regulators may be coupled together to control multiple or all pressure regulators in combination.

Embodiments have the advantages that the regulators can be adjusted to have constant flow by means of maintaining constant differential pressure between the regulators, and that the constant predetermined flow is controlled by itself without intervention from outside system, such as in absence of power or adjusting the flow setting without changing equipment.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method to control a flow rate in a fluid flow network of a system, comprising:
identifying a location in the fluid flow network to set the flow rate of a fluid at a constant level;
connecting multiple pressure regulators to form a flow control device;
connecting an inlet port of the flow control device to an upstream portion of the fluid flow network at the identified location;
connecting an outlet port of the flow control device to a downstream portion of the fluid flow network at the identified location;
setting an upstream pressure regulator in the flow control device to have a first constant pressure at the outlet port of the upstream pressure regulator, the first constant pressure being set to a value that is below a minimum upstream pressure delivered from the upstream portion to the inlet port of the upstream pressure regulator;
setting a downstream pressure regulator in the flow control device to have a second constant pressure at the outlet port of the downstream pressure regulator, the second constant pressure being set to maintain a constant pressure differential across the downstream pressure regulator; and
maintaining, based on the minimum upstream pressure to the flow control device exceeding the first constant pressure and further based on the constant pressure differential maintained across the downstream pressure regulator, the flow rate at the identified location at the constant value;
wherein the multiple pressure regulators comprise the upstream pressure regulator and the downstream pressure regulator connected to each other in series with respect to the upstream portion and the downstream portion of the fluid flow network.

2. The method of claim 1, further comprising:
detecting a pressure change in the system that reduces the minimum upstream pressure to the flow control device to be less than the first constant pressure; and
adjusting, in response to the detected pressure change, the upstream pressure regulator and the downstream pressure regulator to restore the flow rate at the identified location to the constant value.

3. The method of claim 1,
wherein the multiple pressure regulators further comprise an additional pressure regulator connected in series with the upstream pressure regulator with respect to the upstream portion and the downstream portion of the fluid flow network.

4. The method of claim 1,
wherein the multiple pressure regulators further comprise an additional pressure regulator connected in parallel with the downstream pressure regulator with respect to the upstream portion and the downstream portion of the fluid flow network.

5. The method of claim 1, further comprising:
facilitating, based on maintaining the flow rate at the identified location at the constant value, an operation of the system.

6. The method of claim 5, wherein the system comprises one or more of
a cooling system having a heat exchanger as the identified location to set the flow rate at the constant level; and
a pump having a mechanical seal of rotating components as the identified location to set the flow rate at the constant level.

7. A flow control device for a fluid flow network, comprising:
an upstream pressure regulator that is set to have a first constant pressure at an outlet port of the upstream pressure regulator, the first constant pressure being set to a value that is below a minimum upstream pressure delivered from an upstream portion of the fluid flow network to an inlet port of the upstream pressure regulator; and
a downstream pressure regulator that is set to have a second constant pressure at the outlet port of the downstream pressure regulator, the second constant pressure being set to maintain a constant pressure differential across the downstream pressure regulator,
wherein the upstream pressure regulator is coupled to the downstream pressure regulator at an identified location in the fluid flow network to set a flow rate of a fluid to be a constant level,
wherein the inlet port of the flow control device is connected to an upstream portion of the fluid flow network at the identified location,
wherein the outlet port of the flow control device is connected to a downstream portion of the fluid flow network at the identified location,
wherein the flow rate at the identified location is maintained at the constant value based on the minimum upstream pressure to the flow control device exceeding the first constant pressure and further based on the constant pressure differential maintained across the downstream pressure regulator; and
wherein the upstream pressure regulator and the downstream pressure regulator are connected to each other in series with respect to the upstream portion and the downstream portion of the fluid flow network.

8. The flow control device of claim 7,
wherein a pressure change is detected in the fluid flow network that reduces the minimum upstream pressure to the flow control device to be less than the first constant pressure; and
wherein the upstream pressure regulator and the downstream pressure regulator are adjusted, in response to the detected pressure change, to restore the flow rate at the identified location to the constant value.

9. The flow control device of claim 7, further comprising:
an additional pressure regulator connected in series with the upstream pressure regulator with respect to the upstream portion and the downstream portion of the fluid flow network.

10. The flow control device of claim 7, further comprising:
an additional pressure regulator connected in parallel with the downstream pressure regulator with respect to the upstream portion and the downstream portion of the fluid flow network.

11. The flow control device of claim 7, wherein an operation of the fluid flow network is facilitated based on maintaining the flow rate at the identified location at the constant value.

12. The flow control device of claim 11, wherein the fluid flow network is comprised in one or more of a cooling system having a heat exchanger as the identified location to set the flow rate at the constant level; and a pump having a mechanical seal of rotating components as the identified location to set the flow rate at the constant level.

13. A fluid flow system comprising:

an upstream portion of a fluid flow network;

a downstream portion of the fluid flow network; and a flow control device disposed at an identified location of the fluid flow network, comprising:

an upstream pressure regulator that is set to have a first constant pressure at an outlet port of the upstream pressure regulator, the first constant pressure being set to a value that is below a minimum upstream pressure delivered from the upstream portion of the fluid flow network to an inlet port of the upstream pressure regulator; and a downstream pressure regulator that is set to have a second constant pressure at the outlet port of the downstream pressure regulator, the second constant pressure being set to maintain a constant pressure differential across the downstream pressure regulator, wherein the upstream pressure regulator is coupled to the downstream pressure regulator at the identified location in the fluid flow network to set a flow rate of a fluid to be a constant level, wherein the inlet port of the flow control device is connected to the upstream portion of the fluid flow network at the identified location, wherein the outlet port of the flow control device is connected to the downstream portion of the fluid flow network at the identified location, wherein the flow rate at the identified location is maintained at the constant value based on the minimum upstream pressure to the flow control device exceeding the first constant pressure and further based on the constant pressure differential maintained across the downstream pressure regulator; and wherein the upstream pressure regulator and the downstream pressure regulator are connected to each other in series with respect to the upstream portion and the downstream portion of the fluid flow network.

14. The fluid flow system of claim 13, wherein a pressure change is detected in the fluid flow network that reduces the minimum upstream pressure to the flow control device to be less than the first constant pressure; and wherein the upstream pressure regulator and the downstream pressure regulator are adjusted, in response to the detected pressure change, to restore the flow rate at the identified location to the constant value.

15. The fluid flow system of claim 13, the flow control device further comprising:

an additional pressure regulator connected in series with the upstream pressure regulator with respect to the upstream portion and the downstream portion of the fluid flow network.

16. The fluid flow system of claim 13, the flow control device further comprising:

an additional pressure regulator connected in parallel with the downstream pressure regulator with respect to the upstream portion and the downstream portion of the fluid flow network.

17. The fluid flow system of claim 13, wherein an operation of the fluid flow system is facilitated based on maintaining the flow rate at the identified location at the constant value, and wherein the fluid flow system corresponds to one or more of a cooling system having a heat exchanger as the identified location to set the flow rate at the constant level; and a pump having a mechanical seal of rotating components as the identified location to set the flow rate at the constant level.

* * * * *